United States Patent
Nagpal et al.

(10) Patent No.: US 10,356,557 B1
(45) Date of Patent: Jul. 16, 2019

(54) MAGNETIC LANDMARK METHOD AND SYSTEM FOR DETECTING IN-BUILDING (LOCAL VENUE) THRESHOLD

(71) Applicant: MAPSTED CORP., Mississauga (CA)

(72) Inventors: Paramvir Singh Nagpal, Brampton (CA); Henry L. Ohab, Toronto (CA); Saeedeh Hamidifar, Mississauga (CA)

(73) Assignee: MAPSTED CORP., Mississauga, Ontario (CA)

( * ) Notice: Subject to any disclaimer, the term of this patent is extended or adjusted under 35 U.S.C. 154(b) by 0 days.

(21) Appl. No.: 16/190,941

(22) Filed: Nov. 14, 2018

Related U.S. Application Data

(63) Continuation of application No. 15/861,902, filed on Jan. 4, 2018, now Pat. No. 10,165,407.

(51) Int. Cl.
  *H04W 4/02* (2018.01)
  *H04W 4/33* (2018.01)
  *G01C 21/20* (2006.01)
  *H04L 29/08* (2006.01)

(52) U.S. Cl.
  CPC .......... *H04W 4/023* (2013.01); *G01C 21/206* (2013.01); *H04W 4/33* (2018.02); *H04L 67/26* (2013.01)

(58) Field of Classification Search
  CPC ...... H04W 4/023; H04W 4/33; G01C 21/206; H04L 67/26
  USPC .................................................... 340/539.13
  See application file for complete search history.

(56) References Cited

U.S. PATENT DOCUMENTS

| | | |
|---|---|---|
| 6,539,327 B1 | 3/2003 | Dassot et al. |
| 9,170,112 B2 | 10/2015 | Mirov et al. |
| 9,395,190 B1* | 7/2016 | Young ................. G01C 21/206 |
| 9,557,178 B2 | 1/2017 | Ghose et al. |
| 2009/0043504 A1 | 2/2009 | Bandyopadhyay et al. |
| 2012/0143495 A1* | 6/2012 | Dantu ................. G01C 21/206 |
| | | 701/428 |
| 2013/0150076 A1 | 6/2013 | Kim et al. |
| 2013/0332064 A1* | 12/2013 | Funk .................... G01C 21/206 |
| | | 701/409 |
| 2014/0180627 A1 | 6/2014 | Naguib et al. |
| 2015/0018018 A1 | 1/2015 | Shen et al. |
| 2016/0011022 A1 | 1/2016 | Zheng et al. |
| 2016/0066156 A1* | 3/2016 | Le Grand ............. H04W 4/029 |
| | | 455/456.1 |
| 2016/0261987 A1* | 9/2016 | Jovicic ................. G01C 21/206 |
| 2016/0379074 A1 | 12/2016 | Nielsen et al. |
| 2017/0265041 A1 | 9/2017 | Mahasenan et al. |

\* cited by examiner

*Primary Examiner* — Eric Blount
(74) *Attorney, Agent, or Firm* — Henry L. Ohab

(57) ABSTRACT

A method and system for detecting an indoor threshold transition in a positioning state. The method may be executable using one or more processors and comprises, upon detecting a pattern of magnetic anomaly characteristics associated with a sequence of position changes of the mobile device, extracting the pattern, comparing the extracted pattern with a stored magnetic signature associated with the indoor threshold, and based on the comparing, inferring that the mobile device is one of transitioning in position and has transitioned in position across the indoor threshold.

20 Claims, 4 Drawing Sheets

MAGNETIC LANDMARK METHOD AND SYSTEM FOR DETECTING IN-BUILDING (LOCAL VENUE) THRESHOLD

CROSS-REFERENCE TO RELATED APPLICATION

This application claims the benefit of priority to U.S. application Ser. No. 15/861,902 filed 4 Jan. 2018.

TECHNICAL FIELD

The disclosure herein relates to the field of mobile device indoor navigation and positioning.

BACKGROUND

Users of mobile devices are increasingly using and depending upon indoor positioning and navigation applications and features. Seamless, accurate and dependable indoor positioning of a mobile device carried or worn by a user can be difficult to achieve using satellite-based navigation systems when the latter becomes unavailable, or only sporadically available and therefore unreliable, such as within enclosed or partially enclosed urban infrastructure and buildings, including hospitals, shopping malls, airports, universities and industrial warehouses. Wireless communication signal data and magnetic field data may be acquired and measured to aid in localizing a mobile device along a route or trajectory being traversed. A mapping, or fingerprint map, of characteristic signatures associated with wireless communication signals and mobile device sensors, may be correlated with unique positions along a trajectory describing a mobile device movement along a sequence of positions, then accessed to localize a mobile device.

DETAILED DESCRIPTION

Figure 1:
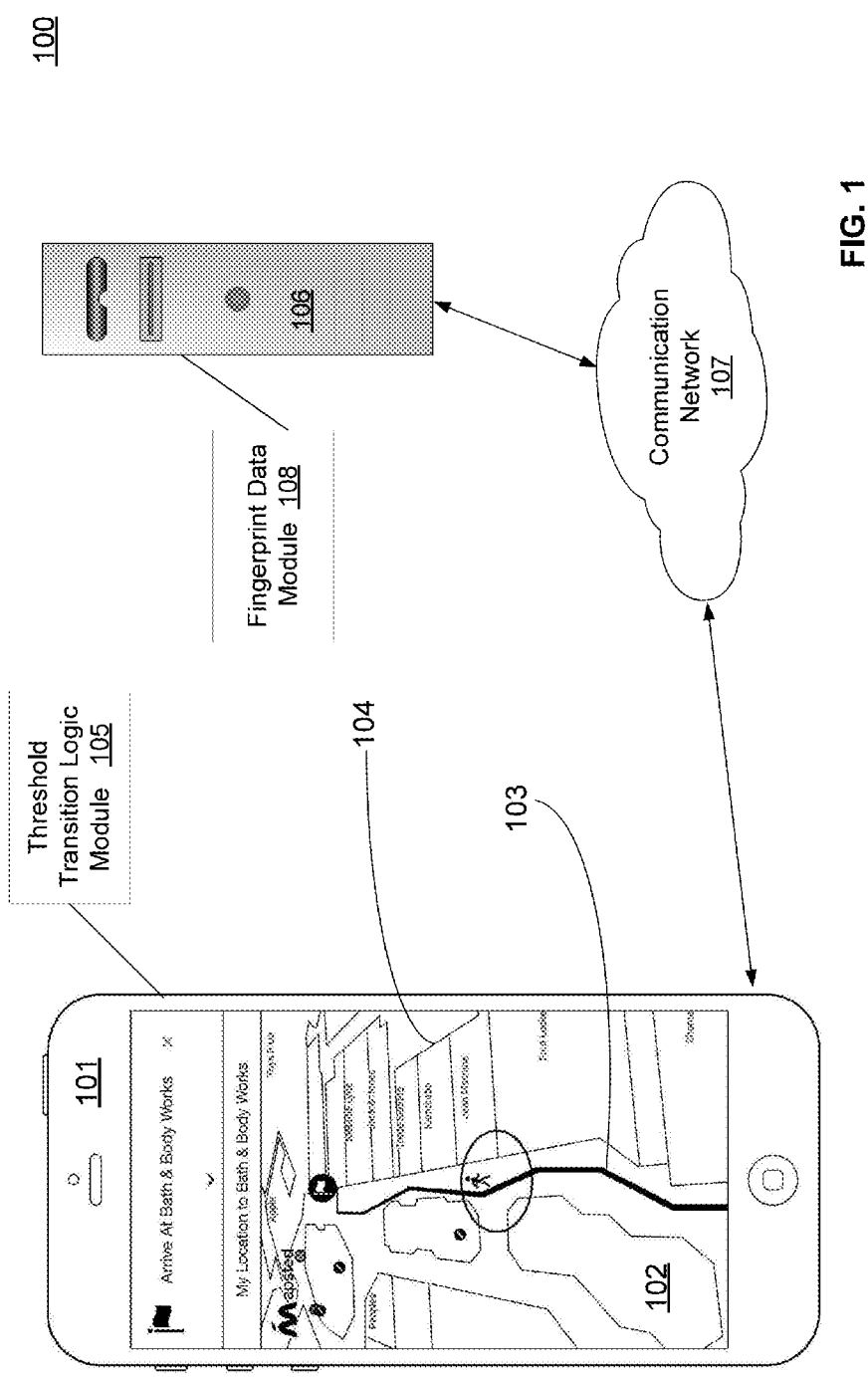
FIG. 1 illustrates, in an example embodiment, an indoor threshold detection system including a mobile device.

Among other advantages and technical effects, embodiments herein provide for detecting a transition of a mobile device across an indoor threshold in an indoor building, such as an entryway threshold upon entering a store or other local venue within the indoor building. Upon detecting a pattern of magnetic anomaly characteristics associated with a sequence of position changes of the mobile device, the magnetic anomaly pattern may be extracted. The pattern may be based on measurements, using a magnetic sensor device of the mobile device, of one or more magnetic characteristics such as a magnetic field strength magnitude, a magnetic dip angle measurement and a mobile device orientation measurement, including, more particularly, any vertical or horizontal components associated with those magnetic characteristics.

The extracted pattern may be compared with a stored magnetic signature based on the magnetic characteristics such as a magnetic field strength magnitude, a magnetic dip angle measurement and a mobile device orientation measurement associated with the indoor threshold, such as may be established by way of a fingerprint calibration process for the indoor environment. Then based on the comparison, inferring that the mobile device is either transitioning in position or has transitioned in position across the indoor threshold if the detected pattern matches the stored pattern associated with the indoor threshold.

Embodiments herein recognize that particular equipment or devices used at a indoor threshold may cause interruption or significant and detectable deviation in magnetic characteristic patterns normally occurring during a mobile device trajectory of motion within the indoor building. For example, in the case of an indoor shopping mall, individual stores may employ radio frequency identification (RFID) security equipment and devices at the store entryway, to detect security violations, for instance. Once deployed, such specialized RFID equipment and devices may induce or introduce significant anomalies or changes in magnetic characteristics normally encountered at or near the respective positions of deployment. The particular magnetic characteristics associated with a given indoor threshold may be recorded, as part of a magnetic fingerprint calibration process, for instance, stored as a magnetic signature unique to that indoor threshold, in one embodiment, and used to localize a mobile device as associated with that threshold position.

In one variation, a magnetic landmark having a pattern of predetermined magnetic characteristics may be deployed at a particular location or local venue. The equipment or device(s) constituting the magnetic landmark may be specially selected or configured to induce particular predetermined magnetic characteristics unique to that landmark and its position or location of deployment. The particular magnetic characteristics associated with a given magnetic landmark thus established may be recorded, again as part of a magnetic fingerprint calibration process for instance, stored as a magnetic signature unique to that magnetic landmark, and used to localize a mobile device as associated with the location or position of deployment of the magnetic landmark. In one embodiment, the equipment constituting the magnetic landmark may be specially selected and configured based on a proclivity for inducing and establishing magnetic characteristics, such as magnetic field magnitude, dip angle and orientation, in a manner that is controllable, stable, repeatable, and persistent over time, to the extent possible.

In yet another embodiment, upon inferring that the mobile device is transitioning across the indoor threshold towards a local venue or store adjoining the indoor threshold, one or more notifications, including push notifications, may be originated by the local venue for transmission to the mobile device. In another variation, upon inferring a transition across the indoor threshold of, or towards, a given local venue or store, the mobile device may be triggered to prefetch venue data associated with that local venue. The venue data may include any one, or any combination, of text, images, and video data, for instance directed to current commercial offers and other information of the local venue.

Among other benefits and technical effects, embodiments herein refer to a magnetic pattern as a series of magnetic measurements in accordance with the magnetic characteristics that correlate with a sequence of positions traversed along a trajectory of motion. It is recognized that different mobile devices, such as smartphones, commonly produce varying or different magnetic field measurements within a given magnetic field, including measurements of magnetic field strength, for example. While individual absolute values of parameters being measured by magnetometer sensor devices of different smartphones, for example magnetic field strength values might differ in absolute magnitude, a spatial pattern in variation of the magnetic measurements may present similar and comparable signatures detectable by those different mobile devices. Reasons for variation in absolute values of magnetic measurements within a given magnetic field may be due, for example, to particular internal components used to build the particular mobile devices, and also the particular external accessories (cases, covers, and other attachments) attached and deployed by a user to customize a mobile device or smartphone. The inventors recognize that using spatial pattern of magnetic field measurements in addition to, or instead of, absolute values of magnetic field measurement at individual, isolated positions, may allow for capturing a curvature, trend or pattern of the magnetic field during a spatial route traversal, and provides basis for localizing a magnetic sensor-equipped mobile computing device in conjunction with a pre-calibrated or reference fingerprint map of an area that includes spatial patterns of magnetic field data, even though those individual mobile devices may exhibit differing magnetic field absolute measurements. The inventors also recognize that mobile device trends or patterns of a magnetic field over a space or area being traversed may enable localization in a robust and repeatable manner across different kinds of mobile devices and smartphones.

Also provided is an indoor threshold transition detecting system comprising a processor, and a memory storing a set of processor-executable instructions. The instructions are executable in the processor to, upon detecting a pattern of magnetic anomaly characteristics associated with a sequence of position changes of a mobile device, extract the pattern, compare the extracted pattern with a stored magnetic signature associated with the indoor threshold; and based on the comparing, infer that the mobile device is transitioning in position, or has transitioned in position, across the indoor threshold.

One or more embodiments described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more embodiments described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

A mobile device as described herein may be implemented, in whole or in part, on mobile computing devices such as cellular or smartphones, laptop computers, wearable computer devices, and tablet devices. Memory, processing, and network resources may all be used in connection with the use and performance of embodiments described herein, including with the performance of any method or with the implementation of any system.

Furthermore, one or more embodiments described herein may be implemented through the use of logic instructions that are executable by one or more processors. These instructions may be carried on a computer-readable medium. In particular, machines shown with embodiments herein include processor(s) and various forms of memory for storing data and instructions. Examples of computer-readable mediums and computer storage mediums include portable memory storage units, and flash memory (such as carried on smartphones). A mobile device as described herein utilizes processors, memory, and logic instructions stored on computer-readable medium. Embodiments described herein may be implemented in the form of computer processor-executable logic instructions or programs stored on computer memory mediums.

System Description

FIG. 1 illustrates, in an example embodiment, an indoor threshold transition system including mobile device 101. Mobile device 101 may be such as a cellular or smartphone, a laptop or a tablet computer, or a wearable computer device that may be operational for any one or more of telephony, data communication, and data computing. Mobile device 101 may be connected within a computer network system, such as communication system 107 including the internet or other wide area network, to one or more remote server computing device(s) 106. While remote server computing device 106 as depicted includes fingerprint data module 108, it is contemplated that, in alternate embodiments, mobile device 101 may include one or more portions of data and processor-executable instructions stored in fingerprint data module 108 that are downloadable and accessible, at least in part, to a memory of mobile device 101 via communication network 107.

A navigation, or positioning, software application downloaded and installed, or stored, in a memory of mobile device 101 may render physical layout map 102 related to a facility or building within a user interface display of mobile device 101. In one embodiment, the navigation software application may incorporate one or more portions the processor-executable instructions manifesting threshold detection logic module 105. The terms indoor facility or building as used herein means an at least partially enclosed building having at least one fixed boundary, such as an exterior boundary wall. Display of physical layout map 102 may further show trajectory or route 103 traversed by mobile device 101, which may include an estimated trajectory segment predicted or anticipated for traversal by mobile device 101. Physical layout map 102 may further depict one or more map constraint features 104, such as an internal wall or other map constraint feature including a doorway, a facility exit, a physical marker fixed in place, a facility entrance, a stairwell, a stairway, a corridor, an elevator, and an external boundary outline of the indoor facility. In some embodiments, map constraint features 104 may constitute partitions between separate local venues, such as commercial stores, depicted in physical layout map 102 of the indoor building.

Mobile device 101 may include sensor functionality by way of sensor devices. The sensor devices may include inertial sensors such as an accelerometer and a gyroscope, and magnetometer or other magnetic field sensing functionality, barometric or other ambient pressure sensing functionality, and ambient lighting sensors, such as to detect ambient lighting intensity. Mobile device 101 may also include capability for detecting and communicatively accessing ambient wireless communication signals including but not limited to any of Bluetooth and Bluetooth Low Energy (BLE), Wi-Fi, RFID, and also satellite-based navigations signals including global positioning system (GPS) signals. Mobile device 101 further includes the capability for detecting, via sensor devices, and measuring a received signal strength, and of determining signal connectivity parameters, related to the ambient wireless signals. In particular, mobile device 101 may include location determination capability such as by way of a GPS module having a GPS receiver, and a communication interface for communicatively coupling to communication network 107, including by sending and receiving cellular data over data and voice channels.

Fingerprint data module 108, or any portion(s) thereof, may be stored in remote computing server device 106, and made communicatively accessible to mobile device 101 via communication network 107. In some embodiments, it is contemplated that fingerprint data module 108, or any portions of data and processor-executable instructions constituting fingerprint data module 108, may be downloaded for storage, at least temporarily, within a memory of mobile device 101. In embodiments, the fingerprint map data stored in fingerprint data module 108 further associates particular positions along route 103 with any combination of fingerprint data, including gyroscope data, accelerometer data, wireless signal strength data, wireless connectivity data, barometric data, acoustic data, line-of sight data, and ambient lighting data, in addition to magnetic data stored thereon.

The terms fingerprint and fingerprint data as used herein refer to time-correlated, individual measurements of any of, or any combination of, received wireless communication signal strength and signal connectivity parameters, magnetic field parameters (strength, direction) or barometric pressure parameters, and mobile device inertial sensor data at known, particular locations along a route being traversed, and also anticipated for traversal, by the mobile device. In other words, a fingerprint may include a correlation of sensor and signal information (including, but not necessarily limited to wireless signal strength, magnetic or barometric information, inertial sensor information) associated for a unique location relative to the facility. Thus, fingerprint data associated with a particular location or position may provide a fingerprint signature that uniquely correlates to that particular location or position. A sequence of positions or locations that constitute a navigation path traversed by the mobile device relative to a given indoor facility may be fingerprint-mapped during a calibration process, and the fingerprint map stored in fingerprint data module 108.

A particular fingerprint or signature based on any of received wireless communication signal strength and signal connectivity parameters, magnetic field parameters or barometric pressure parameters, and mobile device inertial sensor data is detected or recorded by mobile device 101, whereupon the fingerprint or signature as detected may be matched to a reference fingerprint, or a reference pattern including a set of fingerprints, in a stored fingerprint map of a given facility made accessible to threshold detection logic module 105 to identify a unique position of mobile device 101 relative to a local venue threshold. In some embodiments, given that sampling times and sampling rates applied in conjunction with particular mobile device sensors may be different, the signal and sensor information as measured during the fingerprint calibration process may be time-averaged across particular periods of time, with the time-averaged value being used to represent the signal information at any given instance of time within that particular period of time in which the signal information is time-averaged. Fingerprint data may be used to track mobile device 101 traversal along trajectory or route 103 within, and even adjoining, the indoor facility.

Threshold detection logic module 105, constituted of logic instructions executable in a processor of mobile device 101 in one embodiment, may be hosted at mobile device 101 and provides, at least in part, capability for detecting a transition of mobile device 101 across an indoor threshold of a local venue. In one embodiment, the indoor threshold may be a threshold or entrance leading into or out of a local venue, such as a store or business premises, physically partitioned, at least in part, in some embodiments. In alternate embodiments, one or more portions constituting threshold detection mogic module 105 may be hosted remotely at a server device and made communicatively accessible to mobile device 101 via communication network 107.

Figure 2:
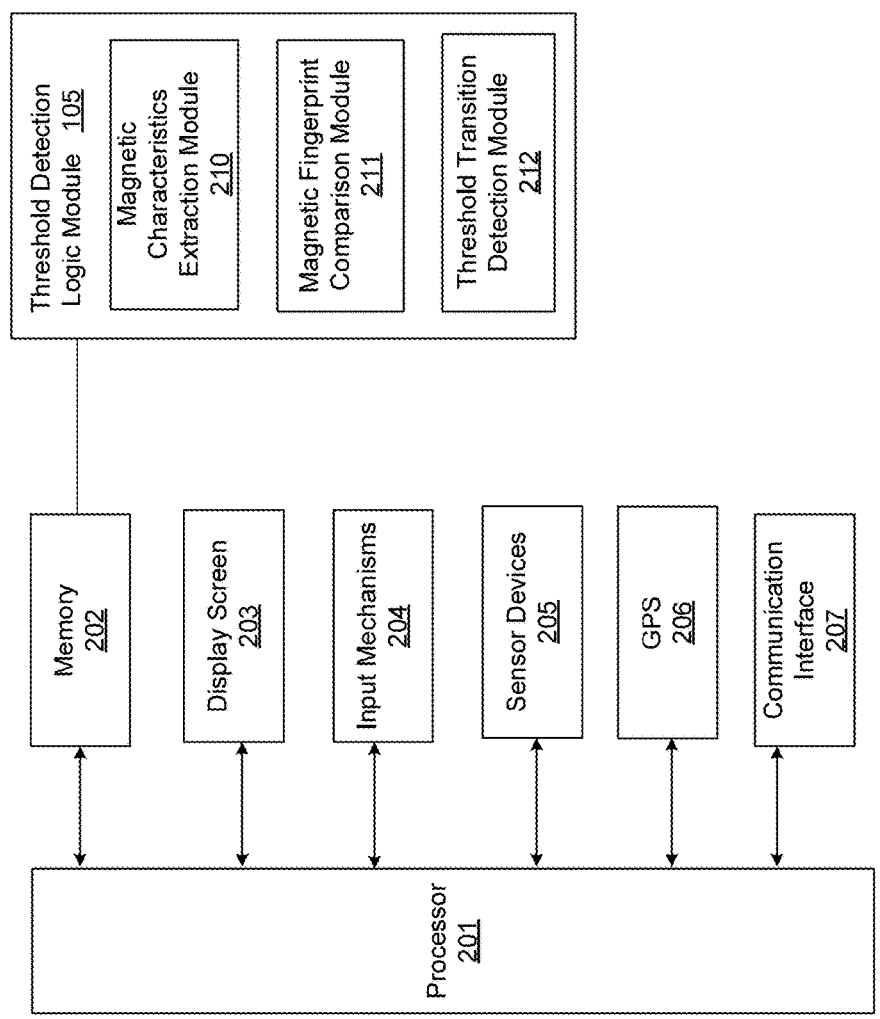
FIG. 2 illustrates, in one example embodiment, an architecture of a mobile device for an indoor threshold detection system.

FIG. 2 illustrates an architecture of mobile device 101 for an indoor threshold transition detection system, in one embodiment. Mobile device 101 may include processor 201, memory 202, display screen 203, input mechanisms 204 such as a keyboard or software-implemented touchscreen input functionality, barcode, QR code or other symbol- or code-scanner input functionality. Mobile device 101 may include sensor functionality by way of sensor devices 205. Sensor devices 205 may include inertial sensors such as an accelerometer and a gyroscope, and magnetometer or other magnetic field sensing functionality, barometric or other ambient pressure sensing functionality, and ambient lighting sensors, such as to detect ambient lighting intensity. Mobile device 101 may also include capability for detecting and communicatively accessing ambient wireless communication signals including but not limited to any of Bluetooth and Bluetooth Low Energy (BLE), Wi-Fi, RFID, and also satellite-based navigations signals such as, but not limited to, global positioning system (GPS) signals. Mobile device 101 further includes capability for detecting, via sensor devices 205, and measuring a received signal strength, and for determining signal connectivity parameters, related to the ambient wireless signals. In particular, mobile device 101 may include location or position determination capability such as by way of GPS module 206 having a GPS receiver, and communication interface 207 for communicatively coupling to communication network 107, including by sending and receiving cellular data over data and voice channels.

Threshold detection logic module 105 of mobile device 101 includes instructions stored in memory 202 of mobile device 101, executable in processor 201. Threshold detection logic module 105 may comprise sub-modules, or portions thereof, including magnetic characteristics extraction module 210, magnetic fingerprint comparison module 211 and threshold transition detection module 212. In alternate embodiments, it is contemplated that any one or more, or portions, of sub-modules including magnetic characteristics extraction module 210, magnetic fingerprint comparison module 211 and threshold transition detection module 212 may be located at remote server device 106 communicatively accessible to mobile device 101 via communication interface 207. Threshold detection logic module 105 provides, at least in part, capability for detecting a transition of mobile device 101 across an indoor threshold. In one embodiment, the indoor threshold may be a threshold or entrance leading into or out of a local venue, such as a store or business premises, physically partitioned at least in part, within an indoor building.

Processor 201 uses executable instructions of magnetic characteristics extraction module 210 to detect a pattern of magnetic anomaly characteristics associated with a sequence of position changes of mobile device 101. The pattern may be extracted for subsequent processing in accordance with magnetic fingerprint comparison module 211 and threshold transition detection module 212.

In some embodiments, both the extracted pattern and the magnetic signature include magnetic characteristics based on at least one of a magnetic field magnitude measurement, a magnetic dip angle measurement and a mobile device orientation measurement, and further including horizontal and vertical magnetic field components of the respective magnetic field data. The magnetic anomaly may be caused, at least in part, by RFID security equipment deployed at entryway thresholds of particular local venues or stores within the indoor building, in some embodiments.

Processor 201 uses executable instructions stored in magnetic fingerprint comparison module 211 to compare the extracted pattern with a stored magnetic signature of fingerprint data module 108 that is associated with an indoor threshold. In various embodiments, the comparing may be performed in a processor of mobile device 101, or server computing device 106 in communication with mobile device 101.

Processor 201 uses executable instructions stored in threshold transition detection module 212 to infer that the mobile device is transitioning in position, or has transitioned in position, across the indoor threshold, based on the comparison of the extracted pattern of magnetic anomaly characteristics with the stored magnetic signature associated with a given local venue threshold. The terms indoor threshold and local venue threshold are used interchangeably herein. The inferring may be at least partly based on matching the extracted pattern with a magnetic signature of the threshold, stored at server 106 or locally at mobile device 101. Based on a close, or a probabilistically close acceptable match of the pattern and stored signature, mobile device 101 may be localized at the indoor threshold, or recognized as transitioning thereto or therefrom. In one variation, upon inferring that the mobile device is transitioning across the indoor threshold towards a local venue adjoining the indoor threshold, one or more push notifications originating from the local venue may be pushed to mobile device 101. In another variation, mobile device 101 may prefetch venue data associated with the local venue. The venue data as pushed or prefetched, including data such as text, or photo or video image(s), may be displayed at mobile device 101.

Methodology

Figure 3:
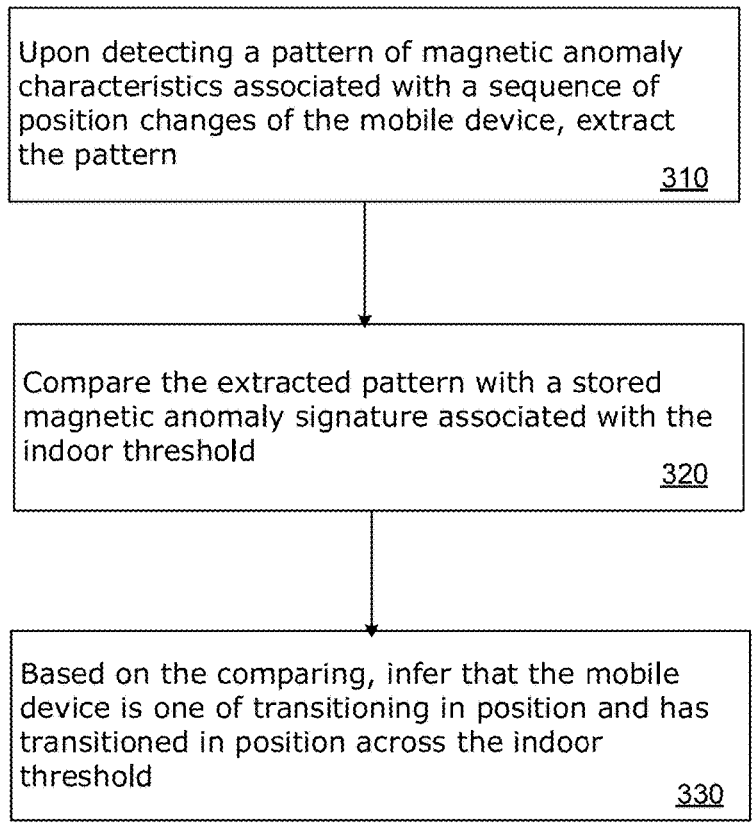
FIG. 3 illustrates an example embodiment of implementing an indoor threshold detection system.

FIG. 3 illustrates an example embodiment of implementing an indoor threshold transition detection system including mobile device 101. In describing examples of FIG. 3, reference is made to the examples of FIGS. 1-2 for purposes of illustrating suitable components or elements for performing a step or sub-step being described.

Examples of method steps described herein relate to the use of server 106 for implementing the techniques described. According to one embodiment, the techniques are performed by threshold detection logic module 105 of mobile device 101 in response to the processor 201 executing one or more sequences of software logic instructions that constitute threshold detection logic module 105. In embodiments, threshold detection logic module 105 may include the one or more sequences of instructions within sub-modules including magnetic characteristics extraction module 210, magnetic fingerprint comparison module 211 and threshold transition detection module 212. Such instructions may be read into memory 202 from machine-readable medium, such as memory storage devices. In executing the sequences of instructions contained in magnetic characteristics extraction module 210, magnetic fingerprint comparison module 211 and threshold transition detection module 212 of threshold detection logic module 105 in memory 202, processor 201 performs the process steps described herein. In alternative implementations, at least some hard-wired circuitry may be used in place of, or in combination with, the software logic instructions to implement examples described herein. Thus, the examples described herein are not limited to any particular combination of hardware circuitry and software instructions. Additionally, it is contemplated that in alternative embodiments, the techniques herein, or portions thereof, may be distributed between the mobile device 101 and server computing device 106. For example, mobile device 101 may collect and transmit data to server 106 that, in turn, performs at least some portion of the techniques described herein.

At step 310, processor 201 executes instructions included in magnetic characteristics extraction module 210 to detect a pattern of magnetic anomaly characteristics associated with a sequence of position changes of mobile device 101. The pattern may be extracted for subsequent processing in accordance with magnetic fingerprint comparison module 211 and threshold transition detection module 212.

In some embodiments, both the extracted pattern and the magnetic signature include magnetic characteristics based on at least one of a magnetic field magnitude measurement, a magnetic dip angle measurement and a mobile device orientation measurement, and further including horizontal and vertical magnetic field components of the respective magnetic field data. The magnetic anomaly may be caused, at least in part, by RFID security equipment deployed at entryway thresholds of particular local venues or stores within the indoor building, in some embodiments.

At step 320, processor 201 executes instructions included in magnetic fingerprint comparison module 211 to compare the extracted pattern with a stored magnetic signature of fingerprint data module 108 that is associated with an indoor threshold. In various embodiments, the comparing may be performed in a processor of mobile device 101, or server computing device 106 in communication with mobile device 101. Fingerprint data module 108 may include mobile device 101 signal data and mobile device 101 sensor data correlated with a sequence of positions describing a movement of a mobile device along a trajectory within or nearby the area. The sensor data may include magnetic field measurement data, including magnetic field strength magnitude, a dip angle, and an orientation of mobile device 101. The magnetic field measurement data may include at least one of a horizontal and a vertical magnetic field component values in addition to an absolute magnitude field measurement value.

At step 330, processor 201 executes instructions included in threshold transition detection module 212 to infer that the mobile device is transitioning in position, or has transitioned in position, across the indoor threshold, based on the comparison of the extracted pattern of magnetic anomaly characteristics with the stored magnetic signature associated with a given local venue threshold. The inferring may be at least partly based on matching the extracted pattern with a magnetic signature of the threshold, stored at server 106 or locally at mobile device 101. Based on a close, or a probabilistically close acceptable match of the pattern and stored signature, mobile device 101 may be localized at the indoor threshold, or recognized as transitioning thereto or therefrom. In one variation, upon inferring that the mobile device is transitioning across the indoor threshold towards a local venue adjoining the indoor threshold, one or more push notifications originating from the local venue may be pushed to mobile device 101. In another variation, mobile device 101 may prefetch venue data associated with the local venue. The venue data as pushed or prefetched may include content items, including text, or photo or video image(s), that may be displayed at mobile device 101.

In embodiments, magnetic fingerprint data of fingerprint data module 108 establishes patterns for the set of magnetic field data measured and observed sequentially along route 103, including magnetic anomaly characteristics associated with various local venue thresholds. In some embodiments, the magnetic anomalies may inherently result from deployment of specialized equipment, such as RFID security equipment, at respective ones of the thresholds. In other variations, the magnetic anomalies may be intentionally configured to create or induce persistent, repeatable and distinct magnetic characteristics, for instance related to field strength magnitude, dip angle and orientation characteristics. Based on a comparison and matching or correlation between the measured and observed magnetic characteristics with magnetic fingerprint data of fingerprint data module 108, mobile device 101 may be localized to a particular position including the local venue threshold, or localized as transitioning thereto or therefrom, along trajectory 103.

Figure 4:
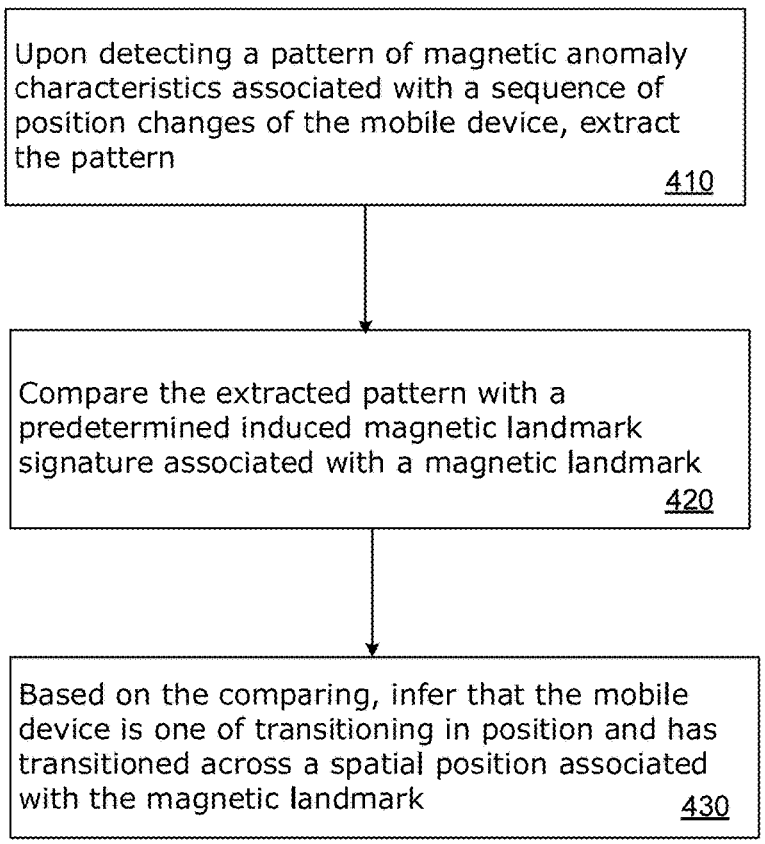
FIG. 4 illustrates an example embodiment of implementing a magnetic detection system including a magnetic landmark feature.

FIG. 4 illustrates an example embodiment of implementing a magnetic detection system including a magnetic landmark feature. The examples of FIG. 4 may incorporate one or more embodiment features according to the examples described in regard to FIGS. 1-3. A pattern of magnetic anomaly characteristics, detectable via a magnetometer of mobile device 101 in one embodiment, may be induced or created by the magnetic landmark. The magnetic landmark may induce the pattern as a predetermined pattern of a set of magnetic characteristics including at least one of a field strength magnitude, a dip angle, and an orientation.

At step 410, upon detecting a pattern of magnetic anomaly characteristics associated with a sequence of position changes of the mobile device, extract the pattern.

At step 411, compare the extracted pattern with a predetermined magnetic landmark signature associated with, or induced by, a magnetic landmark.

At step 412, based on the comparing, infer that the mobile device is one of transitioning in position and has transitioned across a spatial position associated with the magnetic landmark.

It is contemplated for embodiments described herein to extend to individual elements and concepts described herein, independently of other concepts, ideas or system, as well as for embodiments to include combinations of elements recited anywhere in this application. Although embodiments are described in detail herein with reference to the accompanying drawings, it is to be understood that the invention is not limited to those precise embodiments. As such, many modifications and variations will be apparent to practitioners skilled in this art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no specific mention of the particular combination of features. Thus, the absence of describing combinations should not preclude the inventors from claiming rights to such combinations.

What is claimed is:

1. A method of localizing a mobile device in an indoor building, the method executed in one or more processors and comprising:
extracting a magnetic pattern associated with a sequence of position changes of the mobile device, the magnetic pattern indicative of a variation of absolute values of the magnetic measurements in the sequence of position changes along a trajectory of motion of the mobile device;
comparing the magnetic pattern with a stored magnetic signature associated with a magnetic landmark, the pattern being induced by the magnetic landmark; and
based on the comparing, localizing the mobile device in the indoor building, based on a location of the magnetic landmark in the indoor building.

2. The method of claim 1 further wherein the comparing is performed in a processor of one of the mobile device and a server computing device in communication with the mobile device.

3. The method of claim 1, wherein the magnetic landmark is a radio frequency identification (RFID) security equipment in the indoor building.

4. The method of claim 1 wherein the magnetic pattern and the magnetic signature are based on at least one of a magnetic field magnitude measurement, a magnetic dip angle measurement, and a mobile device orientation measurement.

5. The method of claim 4 wherein the magnetic pattern and the stored magnetic signature are based on at least one of a horizontal and a vertical magnetic field component.

6. The method of claim 1 wherein the magnetic landmark is configured to induce the magnetic pattern comprising a predetermined set of magnetic characteristics unique to the magnetic landmark and a position of deployment of the magnetic landmark in the indoor building.

7. The method of claim 1, wherein the method further comprises detecting the magnetic pattern associated with the sequence of positions, wherein the magnetic pattern is extracted upon detecting.

8. The method of claim 1 wherein localizing comprises inferring that the mobile device is one of transitioning in position and has transitioned in position across an indoor threshold corresponding to the magnetic landmark, and wherein the indoor threshold is located at an entranceway to a local venue within a building, and the pattern of magnetic anomaly characteristics is at least partly caused by at least one radio frequency identification device.

9. The method of claim 8 further comprising:
upon inferring that the mobile device is transitioning across the indoor threshold towards a local venue adjoining the indoor threshold, performing at least one of receiving one or more push notifications originating from the local venue and prefetching venue data associated with the local venue; and
displaying, at a user interface of the mobile device, at least one content item associated with at least one of the one or more push notifications and the venue data.

10. A system comprising:
a processor; and
a memory storing a set of instructions, the instructions executable in the processor to:
extract a magnetic pattern associated with a sequence of position changes of the mobile device, the pattern indicative of a variation of absolute values of the magnetic measurements in the sequence of position changes along a trajectory of motion of the mobile device;
compare the pattern with a stored magnetic signature associated with a magnetic landmark, the pattern being induced by the magnetic landmark; and based on the comparing, localize the mobile device in the indoor building, based on a location of the magnetic landmark in the indoor building.

11. The system of claim 10 wherein the comparing is performed in a processor of one of the mobile device and a server computing device in communication with the mobile device.

12. The system of claim 10 wherein, the magnetic landmark is a radio frequency identification (RFID) security equipment in the indoor building.

13. The system of claim 10 wherein the magnetic pattern and the magnetic signature are based on at least one of a magnetic field magnitude measurement and a magnetic dip angle measurement.

14. The system of claim 13 wherein the pattern and the magnetic signature are based on at least one of a horizontal and a vertical magnetic field component.

15. The system of claim 10, wherein the magnetic landmark is configured to induce particular predetermined magnetic characteristics unique to the magnetic landmark and a position of deployment of the magnetic landmark in the indoor building.

16. The system of claim 10 wherein the mobile device is a wearable device, the wearable device is communicatively paired with a smartphone device, and at least the comparing is performed in a processor of the smartphone device.

17. The system of claim 10 wherein the stored magnetic signature is derived from magnetometer sensor data acquired at least partly during a fingerprint calibration process.

18. The system of claim 10 wherein localizing comprises inferring that the mobile device is one of transitioning in position and has transitioned in position across an indoor threshold corresponding to the magnetic landmark, and wherein the indoor threshold is located at an entranceway to a local venue within a building, and the pattern of magnetic anomaly characteristics is at least partly caused by at least one radio frequency identification device.

19. The system of claim 18 further comprising instructions executable in the processor to:
  upon inferring that the mobile device is transitioning across the indoor threshold towards a local venue adjoining the indoor threshold, performing at least one of receiving one or more push notifications originating from the local venue and prefetching venue data associated with the local venue; and
  displaying, at a user interface of the mobile device, at least one content item associated with at least one of the one or more push notifications and the venue data.

20. The system of claim 10 further comprising instructions executable in the processor to detect the magnetic pattern associated with the sequence of positions, wherein the magnetic pattern is extracted upon detecting.

* * * * *